United States Patent [19]

Burton et al.

[11] Patent Number: 4,589,033
[45] Date of Patent: May 13, 1986

[54] METHOD AND APPARATUS FOR INTERRUPTING A FACSIMILE TRANSMISSION

[75] Inventors: Jack D. Burton, Orlando; F. Peter Tyrrell, Altamonte Springs, both of Fla.

[73] Assignee: Ricoh Company Ltd., Tokyo, Japan

[21] Appl. No.: 120,342

[22] Filed: Feb. 11, 1980

[51] Int. Cl.⁴ .............................................. H04N 1/32
[52] U.S. Cl. .................................... 358/257; 358/256
[58] Field of Search ............. 358/257, 256; 179/2 DP

[56] References Cited

U.S. PATENT DOCUMENTS 3,914,538 10/1975 Perreault .............................. 358/257

Primary Examiner—Howard W. Britton
Attorney, Agent, or Firm—Oblon, Fisher, Spivak, McClelland & Maier

[57] ABSTRACT

Disclosed herein is a facsimile transmitting apparatus including a sensor for detecting the dark/light variations in a document and a transmitter for generating and transmitting transmission signals including signals representing those dark/light variations. The transmitting apparatus further includes a receiver for detecting received signals including an interrupt signal of predetermined frequency. Control means are coupled to the transmitter and to the transceiver for interrupting transmission upon detection of the interrupt signal. The receiver includes a means for subtracting the transmitted signal from the received signal so as to generate a difference signal. Transmission is interrupted if the difference signal comprises the predetermined frequency.

4 Claims, 7 Drawing Figures

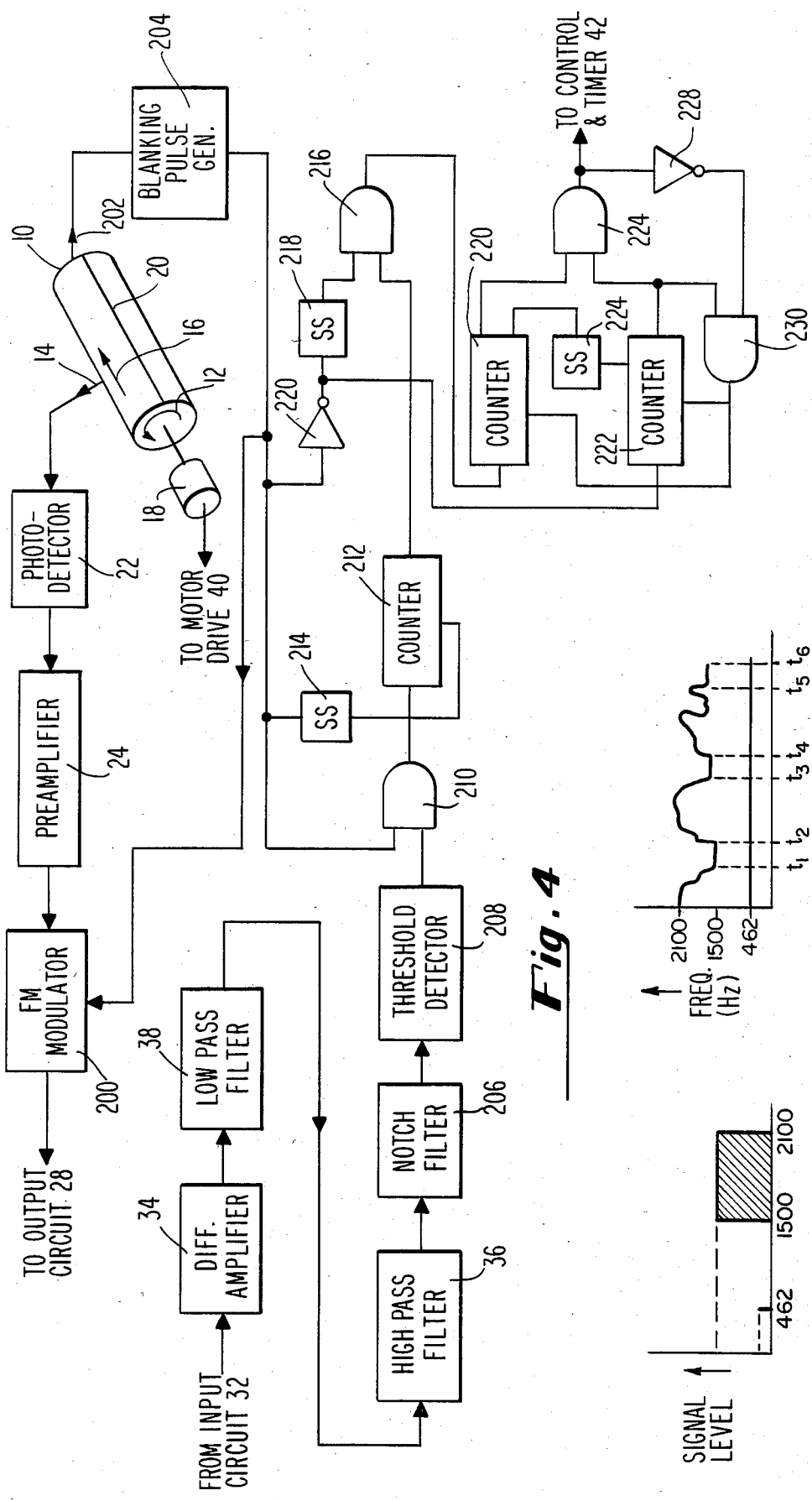

METHOD AND APPARATUS FOR INTERRUPTING A FACSIMILE TRANSMISSION

BACKGROUND OF THE INVENTION

This invention relates to a facsimile transmitter for generating transmission signals representing dark/light variations in a document located at the facsimile transmitter.

Facsimile transmitters typically utilize a communications link in the form of a telephone network to transmit the signals representing dark/light variations in a document to a remotely located receiver. In many if not most instances, the facsimile transmission is uneventful and the receiver receives the transmission signal and converts those signals into dark/light variations on a copy medium without interruption. However, in some instances the receiver may not be able to continue a transmission for a variety of reasons including equipment failure, operator failure or operator choice. If a receiver does discontinue reception of the transmission signals, it is extremely undesirable to continue transmitting signals from the transmitter since such a transmission will consume a substantial length of time which can be rather costly where a communication link such as the telephone network is involved. For example, where a facsimile transmission may take from 2 to 6 minutes, any interruption by the receiver substantially before the end of the transmission will consume a substantial amount of costly telephone network time, e.g., nearly 2 to 98 minutes in some instances depending upon the particular transmission mode involved.

In order to prevent a continued transmission of facsimile signals where a receiver no longer desires or no longer is capable of receiving such signals, the concept of a Procedural Interrupt Signal has been developed. The Procedural Interrupt Signal (commonly referred to as a PIS) is a signal which is generated by a receiver indicating that the receiving mode of that receiver has been interrupted for whatever reason. In accordance with CCITT Standards, the Procedural Interrupt Signal consists of a 462 Hz plus or minus 1.5 Hz signal which is generated at the receiver and applied to the communciation link. The signal is generated continuously for a 3 second minimum and is intended to be detected transmitter so as to indicate to the transmitter that the receiver no longer desires or is capable of receiving the transmission signals. It should be appreciated that the Procedural Interrupt Signal is transmitted simultaneously over the same communications link, e.g., telephone network, as the transmission signals representing dark/light variations in a document. For reasons which will now be explained, a Procedural Interrupt Signal is extremely difficult to detect at the transmitter.

In a typical telephone network communications link, the telephone network will substantially attenuate any signal which is transmitted. Since the Procedural Interrupt Signal is transmitted from the receiver to the transmitter, substantial attenuation of the Procedural Interrupt Signal when received at the transmitter may be anticipated. On the other hand, the transmission signals generated by the transmitter representing the dark/light variations in a document have not yet been attenuated by the telephone network. Accordingly, the signal level of the Procedural Interrupt Signal at the transmitter is substantially lower than the transmission signals representing the dark/light variations in the document. In some cases which are not at all typical, the Procedural Interrupt Signal at the transmitter may have a level of minus 50 dbm as compared with the transmission signals which are at a minus 9 dbm. Under these circumstances, it becomes necessary for the transmitter to detect a signal, i.e., the Procedural Interrupt Signal, which is 41 dbm below the transmitted signal, i.e., the transmission signal representing the dark/light variations in the document. Because of this very low PIS-to-noise ratio, great difficulty is incurred in attempting to detect the Procedural Interrupt Signal.

SUMMARY OF THE INVENTION

It is an object of this invention to provide an effective method and apparatus for determining when a facsimile receiver no longer desires or is no longer capable of operating in a receiving mode.

It is a more specific object of this invention to provide a method and apparatus for reliably detecting a Procedural Interrupt Signal.

In accordance with these and other objects, a preferred embodiment of the invention comprises a method and apparatus for transmitting signals from transmitter representing dark/light variations in a document over a communication link. The procedural interrupt signal is transmitted from the receiver to the transmitter and the transmitted signals are subtracted from the procedural interrupt signal which is coupled to the transmitter. A predetermined frequency content in the subtracted signals is detected and transmitting is interrupted in response to the detecting.

In accordance with another important aspect of the invention, detecting includes phase locking the predetermined frequency to a reference frequency.

In accordance with yet another important aspect of the invention, detecting includes the step of determined period. In accordance with still another important aspect of the invention, the step of detecting includes the step of determining if the predetermined frequency is present for a predetermined duration.

BRIEF DESCRIPTION OF THE DRAWINGS

FIG. 4 is a partially schematic block diagram of another embodiment of the invention; and FIGS. 4a and 4b are diagrams utilized in explaining the embodiment of FIG. 4.

DETAILED DESCRIPTION OF VARIOUS EMBODIMENTS

Figure 1:
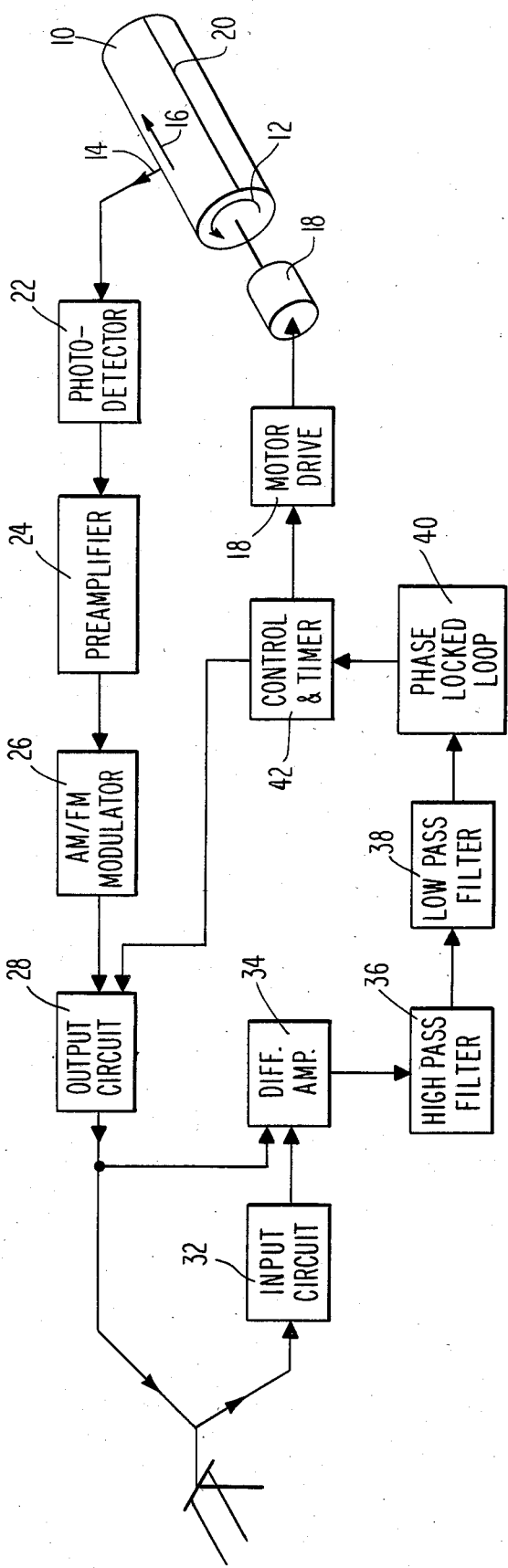
FIG. 1 is a partially schematic blocked diagram of a system representing a preferred embodiment of the invention.

Referring to FIG. 1, a facsimile transmitter comprises scanning means in the form of a rotatable drum 10 which rotates about its axis as indicated by an arrow 12 while a scanning head depicted by a line 14 moves in a direction parallel with the axis of the drum 10 as indicated by a arrow 16. The drum 10 which is driven by a motor 18 includes a clamp 20 which closes on one edge of a document wrapped around the drum 10 so as to permit line by line scanning of the document by head 14 as the drum 10 rotates.

The head 14 which may carry a fiberoptic pick-up is coupled to a photo detector 22 which detects dark/light variations on the document carried by the drum 10. The output from the photo detector 22 is coupled to a pre-amplifier 24 and the output of the pre-amplifier 24 supplied to a modulator 26. In this particular embodiment of the invention, modulator 26 is of the am/pm or FM type as specified by CCITT standards. Such a modulator 26 is employed in the Qwip Two facsimile transceiver manufactured and sold by Qwip Systems Division of Exxon Enterprises, Inc., an affiliate of the assignee of this invention. The output from the modulator 26 is applied to an output circuit 28. The output from the circuit 28 comprises transmission signals representing the dark/light variations in the document at the drum 10 which are then applied to a suitable communications link shown in FIG. 1 as comprising a telephone network 30.

In accordance with this invention, the facsimile transmitter of FIG. 1 is capable of receiving and detecting a Procedural Interrupt Signal transmitted from a remotely located receiver which is receiving the transmission signals from the output circuit 28. This is accomplished by providing a input circuit 32 coupled to the telephone network 30 and applying the output from the input circuit 32 to circuitry capable of the detecting the Procedural Interrupt Signal despite the very low signal-to-noise level at the transmitter.

In accordance with one very important aspect of this invention, detection of the Procedural Interrupt Signal is accomplished in large part by the use of a differantial amplifier 34 which subtracts the transmission signals $S_T$ representing the dark/light variations of the document from signals received at the input circuit 32 which include the transmission signals as well as the Procedural Interrupt Signal $S_{PIS}$. Because of the subtraction provided by the differential amplifier 34, the frequency content of the signals at the output of the input circuit 32 attributable to the frequency components of the transmission signal representing the dark/light variations in the document are greatly attenuated thereby raising the signal-to-noise ratio at the output of the differential amplifier 34 for the facilitating detection of the Procedural Interrupt Signal.

In accordance with another important aspect of the invention, a high pass filter 36 is provided at the output of the differential amplifier 34. The filter 36 in large part attentuates line frequency and its harmonics, i.e., 60 Hz and 120 Hz.

In accordance with another important aspect of the invention, a low pass filter 38 is provided. The filter 38 substantially attenuates the frequency content of the signal above the frequency of the Procedural Interrupt Signal.

Finally, detection of the Procedural Interrupt Signal is completed utilizing a phase locked loop 40 which phase locks a reference frequency substantially equal to the predetermined frequency of the Procedural Interrupt Signal and which provides an output when such a phase locking has occurred. The phase locked loop 40 is a highly sensitive detector of a predetermined frequency and therefore is a very effective and reliable detector of the Procedural Interrupt Signal.

The output from the phase locked loop 40 is applied to a control and timer circuit 42. In this embodiment of the invention, the circuit 42 determines when the duration of the output from the phase locked loop 40 exceeds a predetermined length of time, i.e., 1.25 seconds. When the duration has been detected, the circuit 42 provides an output to a drum motor drive circuit 44 which disables the motor 18. A similar motor drive circuit for the head 14 may also be disabled by the control and timer circuit 42. The control and timer circuit 42 also inhibits the output circuit 28 so as to terminate the transmission in accordance with the objects of this invention.

Figure 1A:
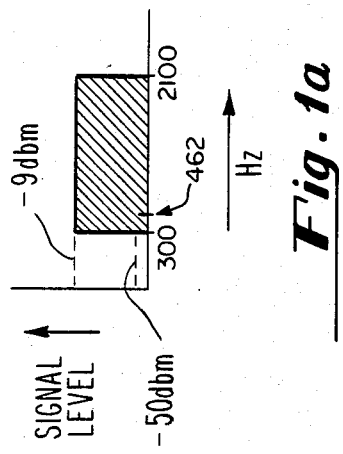
FIG. 1a is a diagram illustrating frequency content in a signal which is utilized in explaining the embodiment of FIG. 1.

In the embodiment of FIG. 1, modulator circuit 26 generates am/pm or FM signals, as discussed above, in accordance with CCITT Standards. Such signals have a frequency content in the range of 300 to 2100 Hz as shown in FIG. 1a wherein the ordinate is Hz and the abscissa is signal level. As shown in FIG. 1a, the signal level of the am/pm transmission signal at the input to the input circuit 32 is minus 9 dbm whereas the signal level of a 462 Hz Procedural Interrupt Signal is only minus 50 dbm. It would therefore be appreciated that detection of the Procedural Interrupt Signal is a demanding task.

Figure 2:
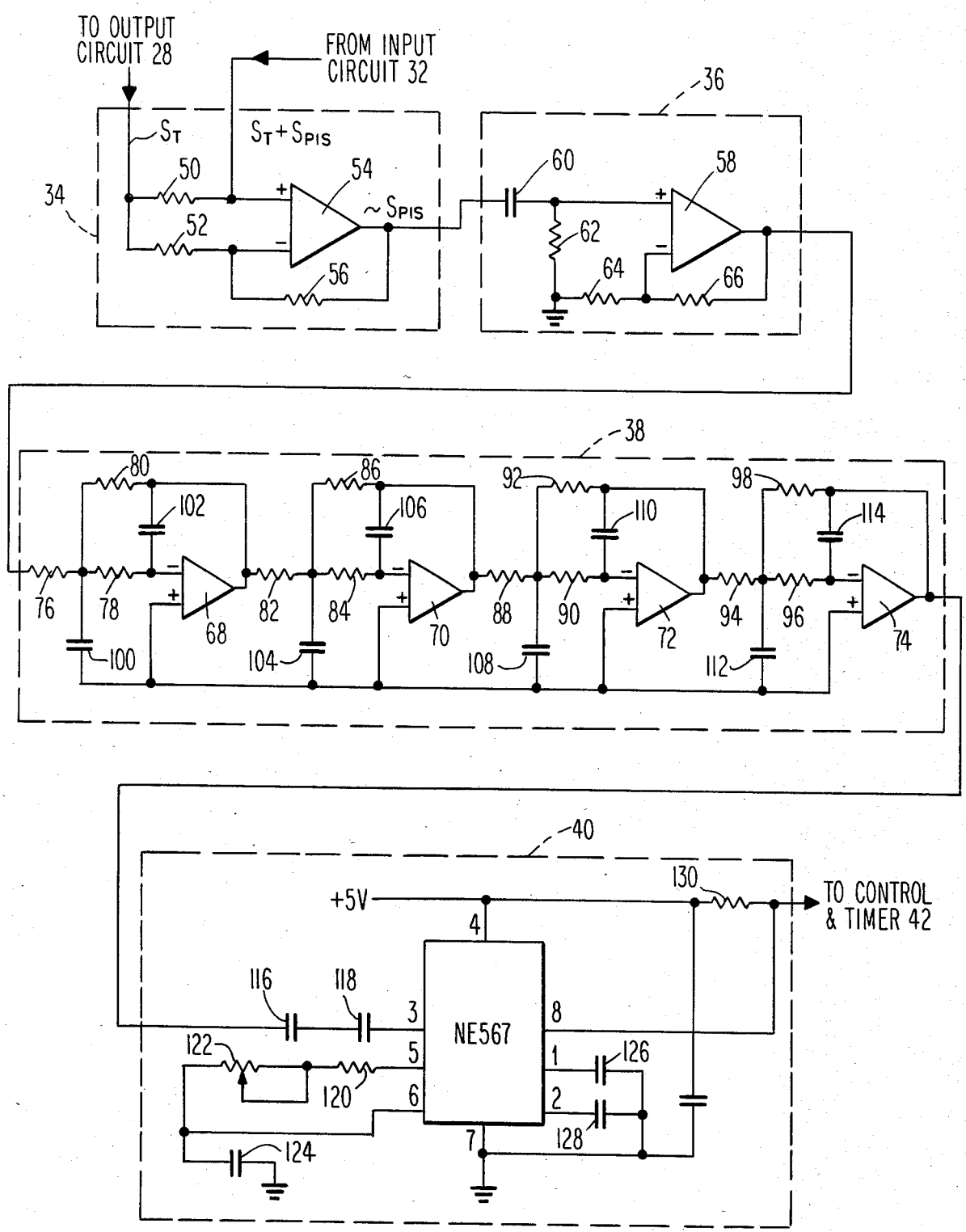
FIG. 2 is a schematic diagram of portions of the block diagram shown in FIG. 1.

Reference will now be made to FIG. 2 for a more detailed description of a number of components shown in FIG. 1 including the differential amplifier 34. Input resistors 50 and 52 are connected to the non-inverting and inverting terminals respectively and of operational amplifier 54. A resistor 56 is connected between the output and the inverting input of the amplifier 54. As previously discussed, the operational amplifier 54 serves to subtract out the transmission signal $S_t$ to a very substantial degree leaving the Procedural Interrupt Signal $S_{PIS}$ plus some additional frequency content. The circuit design shown in FIG. 2 is generally capable of attenuating the local carrier and side bands of the transmission signal $S_T$ 15 to 25 db.

The high pass filter 36 comprises an operational amplifier 58 in combination with a capacitor 60 and resistors 62, 64 and 66. This combination as previously mentioned substantially attenuates the line frequency harmonics, i.e., 60 Hz and 120 Hz.

The low pass filter 38 comprises an eight pole Chebyschev filter comprising 4 operational amplifiers 68, 70, 72 and 74, one operational amplifier for two poles. The filter further comprises resistors 76, 78 and 80, resistors 82, 84 and 86, resistors 88, 90 and 92, and resistors 94, 96 and 98. Capacitors 100, 102, 104, 106, 108, 110, 112 and 114 are also provided. The filter 38 is capable of attenuating the carrier of 2100 Hz and the am side bands above that 500 Hz 50 to 70 db.

It will now be appreicated that the 462 Hz Procedural Interrupt Signal is more prominent in the overall frequency content. However, there is still a substantial amount of noise present. In accordance with one aspect of this invention, detection of the 462 Hz signal proceeds utilizing the phase locked loop 40 which, as shown in FIG. 2, comprises an integrated circuit manufactured by Signetics Corporation and designated as an NE567 chip. The chip includes a plurality of pins 1-8 which are connected to a variety of circuit components which will now be described. An input signal is applied to the NE567 chip through coupling capacitors 116 and 118 from the output of the filter 38. Pins 5 and 6 are connected to an RC combination including a resistor 120, a potentiometer 122 and a capacitor 124 connected to ground. These RC components establish the frequency to be detected, in this case, 462 Hz. Pins 1 and 2 are connected to ground and pin 7 through filter capacitors 126 and 128. The output from the NE567 chip is obtained from pin 8, and a load resistor 130 connects pin 8 to a plus 5 volt power supply which is connected directly to pin 4.

Figure 3:
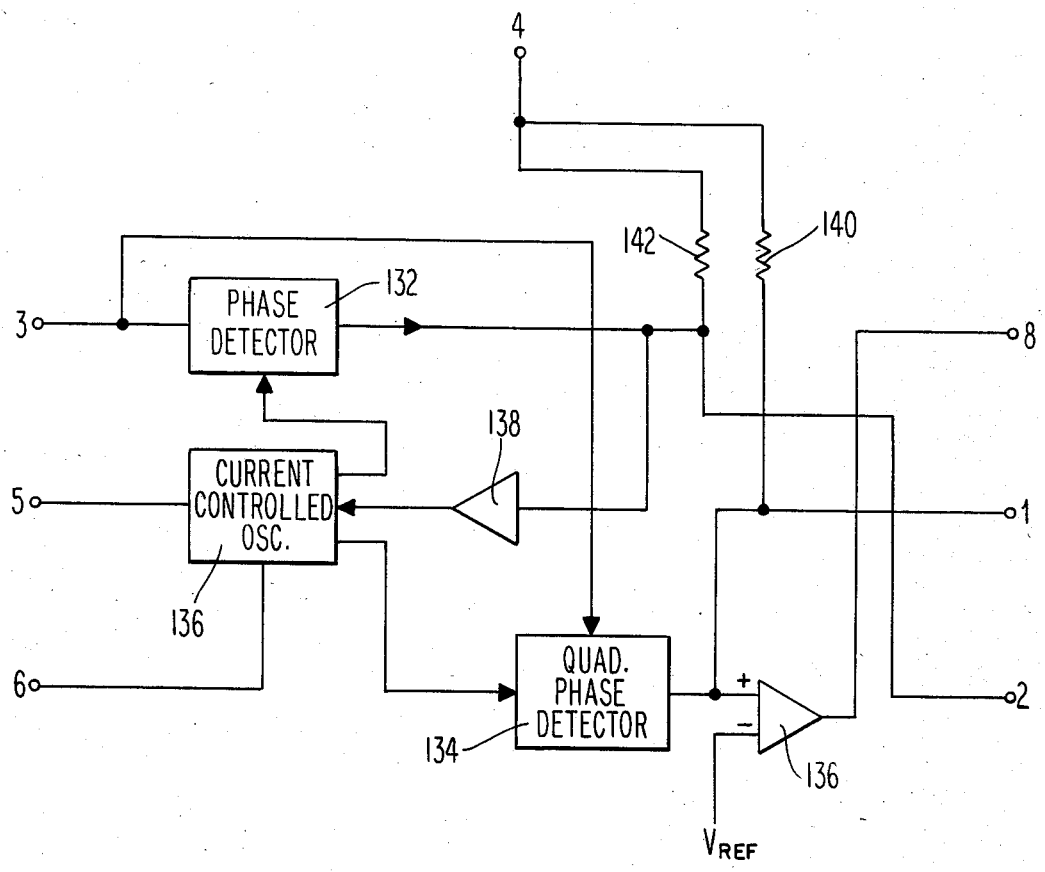
FIG. 3 is a schematic diagram of a portion of a block shown in FIG. 2.

The NE567 chip itself will now be described with reference to FIG. 3. Shown there, the chip comprises a phase detector 132, a quadrature phase detector 134 and a current controlled oscillator 136. An input signal applied to the phase detector 132 at pin 3 is compared in frequency and phase with the output from the current controlled oscillator 136 with a frequency of 462 Hz but variable within a very limited range. Depending upon the output from the phase detector 132, i.e. the phase relationship between the input signal and reference signal supplied by the oscillator 136, the output from the phase detector 132 is fed back to the oscillator 136 through an amplifier 138 to slightly vary the frequency of the oscillator until a 90 degree phase relationship exists between the reference signal and the Procedural Interrupt Signal as detected by the quadrature phase detector 134 and at that time, the quadrature phase detector 134 will produce an output voltage which is compared against a reference voltage $V_{ref}$ comparator 136 which will produce an output signal at pin 8 (low going) when a 462 Hz signal has been detected. Other components in the chip include a bias resistor 138 connected to the noninverting terminal of the operational amplifier 136 and a resistor 140 which connects the input of the amplifier 138 to a bias voltage.

It has been found that use of the phase locked loop 40 provides very reliable detection even when line attenuation reduces the signal level of the 462 Hz Procedural Interrupt Signal to minus 50 dbm. Of course, it will be appreciated that most line conditions are less severe, e.g. 12 to 15 dbm, but it is necessary for the Procedural Interrupt Signal to be detected under worst case conditions.

Reference will now be made to FIG. 4 for a description of another embodiment of the invention. In the embodiment of FIG. 4, an FM modulator 200 is utilized having a input coupled to the photo detector 22 and preamplifier 24. The FM modulator generates signals of frequency content shown in FIG. 4a where the transmission signals representing dark/light variations lie in a range from 1500 to 2100 Hz. Although there is no overlap between the information bearing signals and the 462 Hz Procedural Interrupt Signal itself, the Procedural Interrupt Signal is still difficult to detect because of the low signal-to-noise ratio. The circuit shown in FIG. 4 which reliably detects the Procedural Interrupt Signal will now be described in detail. In the circuit of FIG. 4, the differential amplifier 34, low pass filter 38, and the high pass filter 36 are utilized.

In accordance with an important aspect of this embodiment of the invention, the Procedural Interrupt Signal is only detected during a blanking pulse which substantially coincides with passage of the clamp 20 adjacent the head 14. The generation of the blanking pulse results from detecting the position of the drum 10 by a suitable detector or a switch 202 which is connected to the input of a blanking pulse generator 204. The blanking pulse generator 204 is connected to the modulator 200 which generates a 1500 Hz signal at the strategic time that the clamp 20 passes the head 14.

Since detection in accordance with this embodiment may occur during the blanking pulse, there is a very substantial 1500 Hz frequency content in the transmission signal. For this purpose, a notch filter 206 is provided at the output of the high pass filter 36 to selectively remove the 1500 Hz signal. The output from the notch filter 206 is applied to a threshold detector which converts the 462 Hz Procedural Interrupt Signal to a square wave when that signal exceeds a predetermined level so as to allow detection to be accomplished utilizing a digital circuit in the following manner.

The output from the threshold detector 208 is applied to AND gate 210 which is only enabled during a blanking pulse from the blanking pulse generator 204. The output from the AND gate is supplied to a counter 212 which is reset at the initiation of each blanking pulse. by a brief pulse from a single shot 214. When a predetermined number of 462 Hz pulses from the threshold detector 208 have passed the AND gate 210 and are applied to the reset counter 212, the output of the counter 212 is applied to any AND gate 216 which is briefly enabled by a single shot 218 connected to the output of an invertor 220 at the conclusion of a blanking pulse. The resulting output from the AND gate 216 supplies an input pulse to a counter 220 and advances the counter 1 count. Simultaneously, the output from the invertor 220 is supplied to the input ot another counter 222. The first pulse to the counter 220 will supply an input to a single shot 224 which will reset the counter 222. After resetting, the counter 222 will still advance the counter 1 count since the output of the invertor 220 remains high continuously between blanking pulses. If the counter 220 receives another pulse indicating detection of a predetermined number of 462 Hz pulses at the counter 212, the counter 220 will again advance during the next blanking period. However, even if the counter 212 does not detect a predetermined number of 462 Hz pulses and the counter 220 does not therefore advance, counter 222 will advance at the conclusion of the blanking period. It will therefore be understood that the counters 220 and 222 will only have the same count after a blanking period if the 462 Hz signal was present and detected during the blanking pulse period. After a predetermined number of blanking pulses, e.g., 5 blanking pulses corresponding to 5 revolutions of the drum, an output is produced from the counter 222 which is supplied to an AND gate 226. If the counter 220 goes high and applies an input to the AND gate 226 simultaneously, the AND gate 226 will go high to indicate detection of the Procedural Interrupt Signal. If after the predetermined count in the counter 222, the output of the AND gate 226 does not go high, the predetermined count is applied to the AND gate 230 which will be enabled when the output of an inverter 228 connected to the output ot the AND gate 226 remains high. The high going output from the AND gate 230 resets the counters 220 and 222 to again look for the onset of a Procedural Interrupt Signal.

As emphasized in the foregoing, the 462 Hz Procedural Interrupt Signal is only detected during the blanking pulse period which, as shown in FIG. 4b occurs between times T1 and T2, T3 and T4, T5 and T6 and subsequent periods not shown. By detecting only when the 462 Hz signal is present for predetermined duration (i.e. 3 cycles or more as determined by the counter 212), requiring the presence of the signal during a predetermined period (i.e. the blanking period) and requiring the presence of the signal of predetermined duration for a predetermined number of such periods (i.e. as required by the counters 220 and 222), substantial reliability is provided in the detection of the Procedural Interrupt Signal. Moreover, detection of the Procedural Interrupt Signal is greatly aided since, as shown in FIG. 4b, the frequency content of the transmission signal is more predictable during the blanking periods T1 and T2, T3 and T4, T5 and T6 since no dark/light information is being transmitted during those periods.

It will be appreciated that the control and timer circuit 42 may comprise discrete logic circuitry. On the other hand, the control and timer circuit 42 may comprise a microprocessor. Moreover, the discrete logic circuitry of the embodiment of FIG. 4 may be replaced by a microprocessor.

Although the invention has been described in terms of a scanning mechanism comprising a rotatable drum, it will be appreciated that other scanning mechanisms may be utilized including a flat bed scanner. It will also be appreciated that the Procedural Interrupt Signal may take different forms other than the 462 Hz forms specified by CCITT. It will also be appreciated that other modulation techniques other than am/pm and the fm modulation described herein may be utilized.

Although particular embodiments of the invention have been shown and described and other alternatives and modifications suggested, it will be understood that other embodiments, modifications and alternatives will occur to those of ordinary skill in the art which will fall within the true spirit and scope of the invention as set forth in the appended claims.

What is claimed is:

1. A facsimile transmitting apparatus for transmitting signals representing dark/light variations in a document, comprising:

sensor means for detecting dark/light variations in a document at the transmitting apparatus;

transmitting means for generating and transmitting signals including signals representing the dark/light variations in the document to be transmitted to a remotely located receiver, said transmitting signals having a varying frequency content;

receiving means for detecting received signals including an interrupt signal of predetermined frequency content from the remotely located receiver, said interrupt signal indicating that the receiver has interrupted reception of transmitted signals while said transmitting means is simultaneously generating and transmitting said transmitting signals; and control means coupled to said transmitting means and to said receiving means for interrupting transmission of said transmitting signals, said control means including means for detecting the presence of said predetermined frequency during successive blanking periods when said transmitting means is not transmitting said signals representing said dark/light variations, said control means interrupting transmission only after detecting the presence of said predetermined frequency during a predetermined number of successive blanking periods.

2. The facsimile transmitting apparatus of claim 1 wherein said means for detecting comprises:

means for detecting the presence of a predetermined number of cycles of said predetermined frequency during each of said blanking periods.

3. The facsimile transmitting apparatus of claim 1 further comprising scanning means, said specific frequency content being transmitted during a periodic scanning position.

4. the facsimile transmitting apparatus of claim 3 wherein said scanning means comprises:

a rotatable drum having a clamp and said periodic scanning position consists of a periodic rotational position of said drum relative to said sensor means.

* * * * *